(12) United States Patent
Saleem

(10) Patent No.: US 12,442,849 B2
(45) Date of Patent: Oct. 14, 2025

(54) DETERMINING RESISTANCE IN AN ELECTRIC CIRCUIT

(71) Applicant: Rimac Technology LLC, Sveta Nedelja (HR)

(72) Inventor: Sanwal Saleem, Zagreb (HR)

(73) Assignee: Rimac Technology LLC, Sveta Nedelja (HR)

( * ) Notice: Subject to any disclaimer, the term of this patent is extended or adjusted under 35 U.S.C. 154(b) by 108 days.

(21) Appl. No.: 18/001,795

(22) PCT Filed: Jun. 28, 2021

(86) PCT No.: PCT/EP2021/067661
§ 371 (c)(1),
(2) Date: Dec. 14, 2022

(87) PCT Pub. No.: WO2022/002836
PCT Pub. Date: Jan. 6, 2022

(65) Prior Publication Data
US 2023/0236236 A1 Jul. 27, 2023

(30) Foreign Application Priority Data
Jun. 30, 2020 (EP) .................................. 20183192

(51) Int. Cl.
*G01R 31/52* (2020.01)
*G01R 31/12* (2020.01)
*G01R 31/00* (2006.01)

(52) U.S. Cl.
CPC ......... *G01R 31/1272* (2013.01); *G01R 31/52* (2020.01); *G01R 31/007* (2013.01)

(58) Field of Classification Search
CPC ...... G01R 31/52; G01R 27/025; G01R 27/18; G01R 31/1272; G01R 31/12; G01R 31/50;
(Continued)

(56) References Cited

U.S. PATENT DOCUMENTS

| 6,906,525 B2 * | 6/2005 | Suzuki | B60L 3/0023 |
| | | | 324/509 |
| 7,863,910 B2 * | 1/2011 | Ishii | G01R 31/52 |
| | | | 324/704 |

(Continued)

FOREIGN PATENT DOCUMENTS

| CN | 2018 86083 U | 6/2011 |
| CN | 109324231 A | 2/2019 |

(Continued)

*Primary Examiner* — Vinh P Nguyen
(74) *Attorney, Agent, or Firm* — Seed Intellectual Property Law Group LLP

(57) ABSTRACT

Disclosed herein are methods for determining resistance in an electric circuit, including the steps of: applying a voltage pulse to a test point of said electric circuit, said voltage pulse having a predetermined pulse duration; measuring an electric observable at a response point of said electric circuit during at least a part of said pulse duration; estimating during said pulse duration an expectation value from said measured observable; and determining said resistance from said expectation value. Also disclosed herein are devices for determining resistance in an electric circuit.

11 Claims, 4 Drawing Sheets

(58) Field of Classification Search
CPC ........ G01R 31/08; G01R 27/02; G01R 31/00;
G01R 27/08; G01R 31/58; G01R
19/0092; G01R 31/54; G01R 19/165;
G01R 31/392; G01R 27/26; G01R 27/14;
G01R 19/16542; G01R 19/00; G01R
19/0084; G01R 31/2812; G01R 31/385;
G01R 19/16547; G01R 19/2513; G01R
31/3275; G01R 19/0023; G01R 31/3835;
G01R 19/252; G01R 19/16566; G01R
27/00; G01R 31/007; H02J 2310/48;
H02J 7/0047; G06F 30/20
See application file for complete search history.

(56) References Cited

U.S. PATENT DOCUMENTS

| | | | | |
|---|---|---|---|---|
| 8,466,691 | B2* | 6/2013 | Hernando | G01R 27/025 |
| | | | | 324/713 |
| 9,579,977 | B2* | 2/2017 | Gale | G01R 31/52 |
| 10,067,176 | B2* | 9/2018 | Sung | G01R 31/1236 |
| 11,193,981 | B2* | 12/2021 | Kim | G01R 27/08 |
| 11,733,310 | B2* | 8/2023 | Huang | G01R 31/52 |
| | | | | 340/660 |
| 12,153,076 | B2* | 11/2024 | Yoon | G01R 31/12 |
| 2013/0307338 | A1 | 11/2013 | Weiss et al. | |
| 2014/0114591 | A1 | 4/2014 | Broeckmann et al. | |

FOREIGN PATENT DOCUMENTS

| | | |
|---|---|---|
| DE | 10 2012 019095 A1 | 3/2014 |
| EP | 1 930 737 A1 | 6/2008 |
| EP | 3 130 932 A1 | 2/2017 |
| EP | 3361270 A1 | 8/2018 |
| EP | 3 385 729 A1 | 10/2018 |
| JP | 2011220788 A | 11/2011 |
| WO | WO 2008016179 A1 | 2/2008 |

* cited by examiner

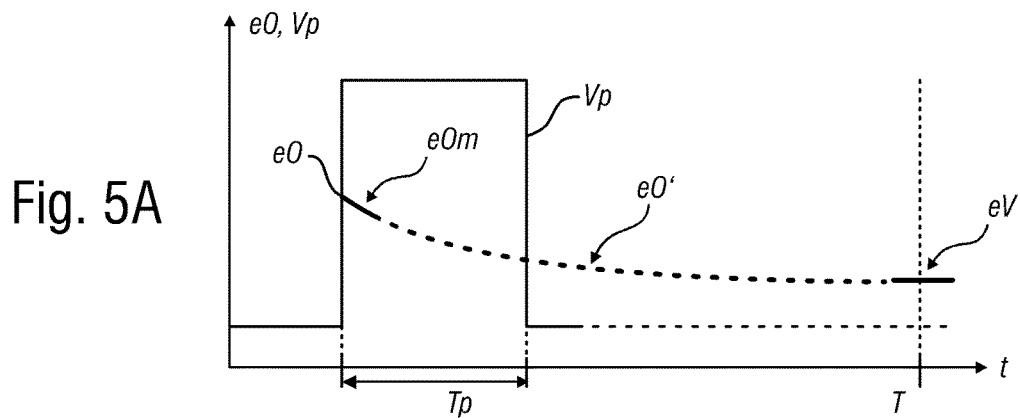
Fig. 5A
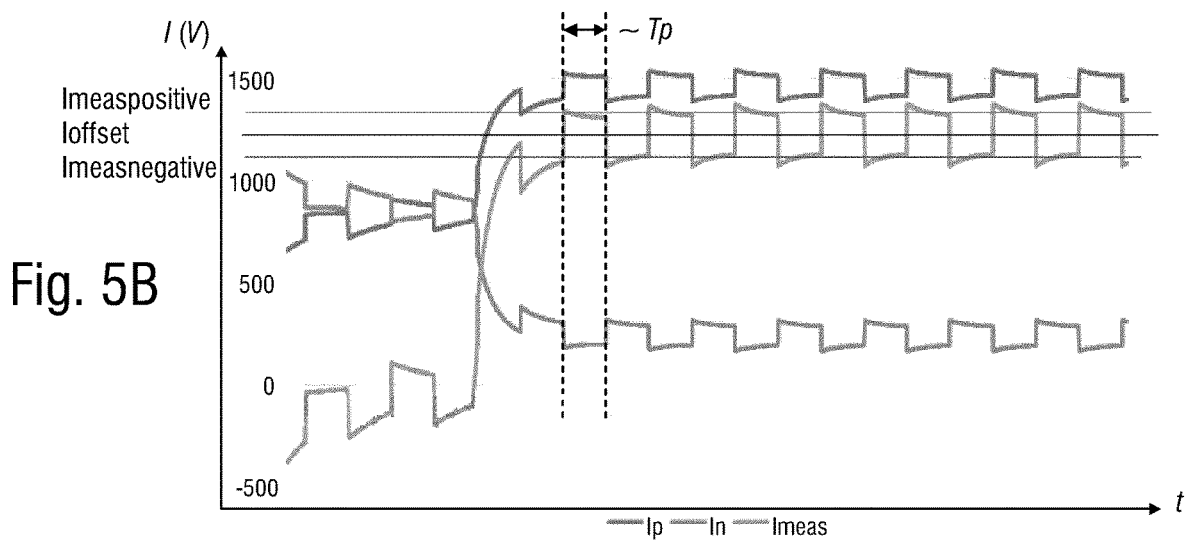
Fig. 5B
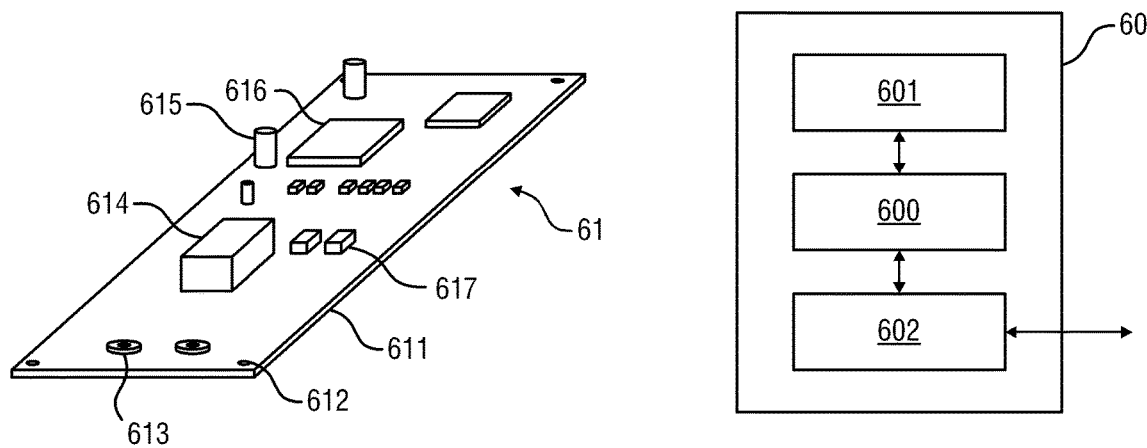
Fig. 6A
Fig. 6B

DETERMINING RESISTANCE IN AN ELECTRIC CIRCUIT

TECHNICAL FIELD

The present invention relates to determining a resistance in an electric circuit. Corresponding implementations relate to a resistance determination method, a resistance determination device, a resistance determination system, a resistance determination microcontroller as well as a corresponding resistance determination program. The present invention can for example find an application in the context of battery charging, as e.g. common in many fields including telecommunication, automobiles, consumer products etc.

TECHNICAL BACKGROUND

In the vast field of electric circuits, it is a common task to determine a resistance within such an electric circuit. Such a resistance can be of particular interest when monitoring the insulation of an electric circuit where the resistance to be determined relates to the insulation, e.g. between parts of the circuit and parts of a housing, chassis or body of a vehicle.

Generally, insulation monitoring can be implemented by continuously determining the so-called insulation resistance between two parts of an electric circuit where it is required that the voltage, which is possibly a high voltage, is confined in a first part of the electric circuit and does not come into contact with a second part of the electric circuit which could lead to serious danger to a part of the electric circuit as well as any persons in the vicinity of the circuit. Once a fault is determined in such an electric circuit which typically means that the insulation resistance drops below a predetermined threshold, an appropriate reaction can be performed such as turning off the circuit and thus avoiding danger, damage, and injuries.

An aspect of insulation monitoring is that insulation resistance can be continuously determined which includes that within a very short time span it can be determined whether a fault occurred, immediate action and appropriate measures can be taken. In some conventional systems, this is typically not a concern as methods for determining a resistance providing a sufficiently high reactivity for allowing a timely reaction are available. Such methods and concepts include the repeated or periodic application of voltage pulses at some test point of the electric circuit and then measuring the response.

However, with the advent of high voltages system into everyday life, for example in the form of new technologies including among others electric vehicles, insulation monitoring and consequently determining a resistance has become more and more important. Naturally, if an electric circuit uses high voltages, a higher insulation resistance is required. A further aspect is the use of larger capacitors that usually render the reaction of getting the correct measurement slow, especially in the context of voltage pulses. The mentioned capacitors also include so-called Y-capacitors that are commonly connected between the load, the power supply, and the part that is to be isolated and usually have relatively high capacitances for reducing noise such as electromagnetic interference (EMI).

However, in such cases the applied voltage pulse can be deformed and, as a result, the response of the circuit to the pulse cannot be measured fast enough, as required for achieving a quick enough response in case of a fault. In fact, in the conventional arts it may require more time for determining a resistance or insulation state of the system than is available in view of the pulse length of the test voltage pulse, the repetition time of the pulses or, simply, the maximum reaction time for achieving reliable and sufficient protection.

Therefore, there is a need for improved ways of determining a resistance in an electric circuit, especially in the context of insulation monitoring. Moreover, there is a need for concepts that allow for determining a resistance within a short time frame such that the resistance can be determined continuously in real time. In particular, it is desired that such concepts even provide reliable output in electric circuits in which the corresponding observable that is measured for determining the resistance does not converge within the time frame required for continuous, real time or quasi real time resistance determination.

SUMMARY

The above problems are solved by the subject-matter of the independent claims. Further preferred embodiments are given by the subject-matter of the dependent claims.

According to an embodiment of the present invention, there is provided a method of determining a resistance in an electric circuit comprising the steps of applying a voltage pulse to a test point of said electric circuit, said voltage pulse having a predetermined pulse duration; measuring an electric observable at a response point of said electric circuit during at least a part of said pulse duration; estimating during said pulse duration an expectation value from said measured observable; and determining said resistance from said expectation value.

According to another embodiment of the present invention, there is provided a device for determining a resistance in an electric circuit configured to apply a voltage pulse to a test point of said electric circuit, said voltage pulse having a predetermined pulse duration; measure an electric observable at a response point of said electric circuit during at least a part of said pulse duration; estimate during said pulse duration an expectation value from said measured observable; and determine said resistance from said expectation value.

According to another embodiment of the present invention, there is provided a microcontroller for instructing an apparatus to execute steps of determining a resistance in an electric circuit, the steps comprising of: applying a voltage pulse to a test point of said electric circuit, said voltage pulse having a predetermined pulse duration; measuring an electric observable at a response point of said electric circuit during at least a part of said pulse duration; estimating during said pulse duration an expectation value from said measured observable; and determining said resistance from said expectation value.

According to another embodiment of the present invention, there is provided a computer-implemented program for determining a resistance in an electric circuit comprising code that instructs a device during operation to apply a voltage pulse to a test point of said electric circuit, said voltage pulse having a predetermined pulse duration; measure an electric observable at a response point of said electric circuit during at least a part of said pulse duration; estimate during said pulse duration an expectation value from said measured observable; and determine said resistance from said expectation value.

BRIEF DESCRIPTION OF THE DRAWINGS

Embodiments of the present invention, which are presented for better understanding the inventive concepts but which are not to be seen as limiting the invention, will now be described with reference to the figures in which:

FIGS. 5A to 5B show schematic views of electric observables and applied signals in the context of electric circuits subject to insulation resistance determination according to an embodiment of the present invention;

FIG. 6A shows a schematic view of a device embodiment of the present invention; and FIG. 6B shows a schematic view of a general device embodiment of the present invention.

DETAILED DESCRIPTION

Figure 1A:
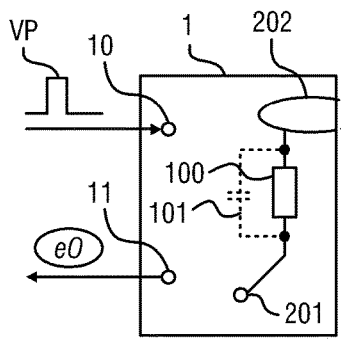
FIGS. 1A to 1C show schematic views of electric circuits subject to insulation resistance determination according to an embodiment of the present invention.

FIG. 1A shows a schematic view of an electric circuit 1 subject to resistance determination according to the embodiments of the present invention. The electric circuit 1 can generally include electric and electronic components, active and/or passive components, modules, integrated circuits, conductors, wires, printed circuit boards, chassis and enclosures, and the like as these are individually all well known from the conventional arts. The electric circuit 1 can be an unearthed electric circuit, a vehicle-side battery circuit, an electric circuit in a high-voltage system, a circuit representing an entire apparatus, such as a vehicle including its chassis and body, or any other electric circuit. The circuit 1 provides at least a test point 10, at least a response point 11, and at least a resistance 100 which is to represent a resistance between one part 201 of the circuit 1 to some other part or component 202 of the circuit. The other part 202 may be fully comprised by the circuit 1 or may also extend toward an exterior of the circuit 1.

In a specific variation of the present embodiment, the component/other part 202 can be a chassis or housing at least in part surrounding parts of the circuit 1, and the resistance 100 can be a corresponding insulation resistance that electrically isolates the chassis 202 as part of the circuit 1 to respective parts of the circuit 1, e.g. parts that carry a high voltage and that should be protected by means of the chassis. Generally, in such embodiments, the component 202 represents the entity that is to be sufficiently isolated from the circuit or the corresponding parts thereof. In some embodiments the circuit may comprise a capacitor 101, such as Y-capacitor which is a capacitor parallel to the resistance 100 to reduce electromagnetic interference.

As shown in FIG. 1A, a voltage pulse VP is applied to the test point 10. The voltage pulse VP can have a predetermined pulse duration, which is denoted by Tp elsewhere in the present disclosure. The voltage pulse might have for example a rectangular shape. In addition, the duration of the pulse can be changed in accordance to requirements to the process. For example, the duration may be shortened when the frequency of real-time monitoring has to be increased or can be lengthened no high frequency of real-time monitoring is required. Additionally, computational constraints may be considered when adjusting the duration. Further, it might be an appropriate approximation of any shape which can simplify the generation of the pulse and is thus not limited to the exact form. The shape might have only positive components or only negative components or both positive and negative components. Positive and negative components might be the same for symmetry or might be different, resulting an asymmetric shape. For symmetry reasons it might be advantageous to have both positive and negative components alternating that are equal in shape, amplitude and pulse duration. Further, the pulse might be periodic or aperiodic. The pulse might further comprise several sub-pulses or might be a single pulse.

At the response point 11 an electric observable eO of the electric circuit 1 can be measured; this can be done for at least a part of the pulse duration of the voltage pulse VP. The measured observable might be the voltage, the current or the resistance in the system as well as any other quantity of the system that can be measured. In particular, the observable may be a derived quantity which is only implicitly related to the above quantities, the estimated quantity or the resistance. For simplicity of the measurement, measuring the voltage might be advantageous. It is noted that the electric circuit might comprise more than one response point 11, in particular in case more than one electric observable eO is measured, these different electric observables may be measured at the same response point or at different response points. This is particularly relevant in the case that different voltages being measured at different parts of the electric circuit 1.

Based on the measured electric observable eO an expectation value can be estimated and following this the resistance 100 can be determined from the expectation value. Similarly to the measured observable, the estimated expectation value can be the voltage, the current or the resistance as well as any other quantity of the system that can measured, including a derived quantity that is only implicitly related to the above quantities, the measured observable or the resistance. Estimating the expectation value from the measured observable can comprise fitting the measured observable to a predetermined model to estimate the expectation value but may also comprise inferring the expectation value directly from the measure observable. The predetermined model may be chosen among a plurality of candidate models beforehand or may be chosen from the plurality of candidate models based on the measured observable. The method used for estimation may be chosen beforehand among a plurality of estimation methods or may be chosen based on the measured observable.

Determining the resistance from the estimated expectation value can be performed by directly inferring the resistance from the estimated expectation value, for example in case that the expectation value is a resistance, or can performed by further manipulating respective calculating the estimated expectation value, for example if the estimated expectation value is a voltage or a current; then determining the resistance can be done using the estimated expectation value, the known or measured parameters of the system and Ohm's law. In other words, if the measured observable is not a resistance, all measured values can be transformed into resistance before the estimation is performed or first the estimation of the relevant quantities is performed and the transformation into a resistance is performed afterwards.

Figure 1B:
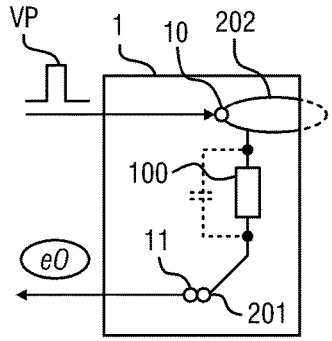

FIG. 1B shows a schematic views of a further electric circuit subject to insulation resistance determination according to an embodiment of the present invention. For the most part, the explanations and description provided in conjunction with FIG. 1A also applies to this electric circuit and thus only the differences are described. According to the shown embodiment, the test point 10 is an electrical connection to the element 202, and the response point 11 is an electrical connection to the part 201 of the circuit 1 that is separated from the element 202 by the resistance 100. In a specific variation of this embodiment, the element 202 is a chassis enclosing at least in part the parts of circuit that carries a voltage which is to be insulated by means of the resistance 100 in the sense of an insulation resistance.

Figure 1C:
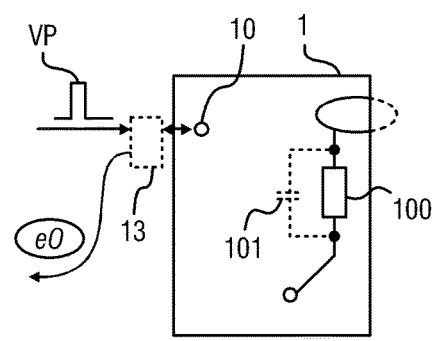

FIG. 1C shows a schematic views of a further electric circuit subject to insulation resistance determination according to an embodiment of the present invention. For the most part, the explanations and description provided in conjunction with FIGS. 1A and 1B also applies to the electric circuit 1 and thus only the differences are described. Specifically, this embodiment considers the alternative to employ the test point 10 for both applying the voltage pulse VP as well as measuring the electric observable eO. For this purpose, a multiplexer, switch, and/or directional coupler, shown as component 13, may be optionally provided in order to use the one test point 10 for both purposes.

Figure 1D:
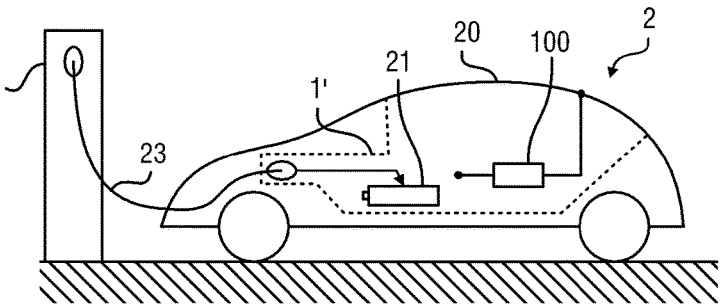
FIG. 1D shows a schematic view of an electric circuit subject to insulation resistance determination in the context of charging an electric vehicle and according to an embodiment of the present invention.

FIG. 1D shows a schematic view of an electric circuit subject to insulation resistance determination in the context of charging an electric vehicle and according to an embodiment of the present invention. This embodiment is directed at a situation in which an electric vehicle 2 is charged. Specifically, there is shown the vehicle 2 including a metallic or at least in part electrically conducting chassis 20 which is charged while in connection with cable 23 to an electric vehicle charging station 3. More in detail, during charging the cable 23 connected an electric circuit 1' of the vehicle to a power and voltage source (station 3). The circuit 1' in this case would at least comprise a battery 21, at least a part of the vehicle body 20 and other components and would be the entity that is subject to insulation resistance determination and monitoring along the embodiments of the present invention. The resistance 100 would be assumed between parts of the circuit 1' that carry a voltage that is to be insulated from the chassis 20. The resistance 100 therefore represents in this case an insulation resistance protecting the outside (e.g. operator touching the vehicle) from potentially hazardous voltages inside. That is, the insulation resistance provides protection to the chassis and potential persons in the car.

Figure 2A:
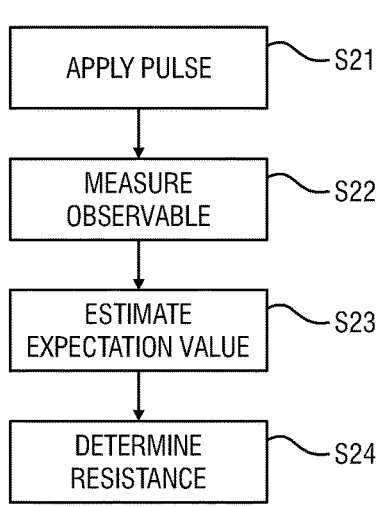
FIGS. 2A and 2B show flowchart of general method embodiments of the present invention.

FIG. 2A shows a flow diagram of a method for determining a resistance according to an embodiment. In a first step S21, a voltage pulse VP having a predetermined pulse duration Tp is applied to a test point 10 of the electric circuit 1. This voltage might be for example +40V or −40V. Applying the voltage pulse can be performed using pulse injection. Then, in step S22, the electric observable eO is measured during at least a part of the pulse duration Tp at a response point 11 of the electric circuit 1. Further, in step S23 from said measured electric observable eO an expectation value is estimated during the pulse duration. Advantageously, the pulse duration can be shorter than a time span during which the observable approaches, within a predetermined tolerance, the expectation value. This estimation can be performed using fitting, that is, the measured electric observable is used in a predetermined model to determine the expectation value of the electric observable. Examples for such fitting methods are least square methods, such an ordinary least squares or total least squares. Possible models used for fitting are exponential functions, linear functions as well as polynomial functions and sinusoidal functions. Neither the fitting method nor the model used therefore are particularly limited. Further, in step S24, the resistance is determined from the expectation value.

In an additional step S25, not depicted in FIG. 2A, it is determined whether a fault has occurred based on the determined resistance, wherein the fault may be a short circuit, a resistance dropping below a predetermined threshold, an insulation breakage or any other fault depending on the circuit and its characteristics as well as the purpose of the resistance. In addition, the method may further comprise a step S26 of reacting to the determined fault, also not depicted in FIG. 2A. This may comprise turning the circuit off, reducing the current and/or the voltage or other protective measures that allow to remedy the determined fault or initiate appropriate counter-measures.

Figure 2B:
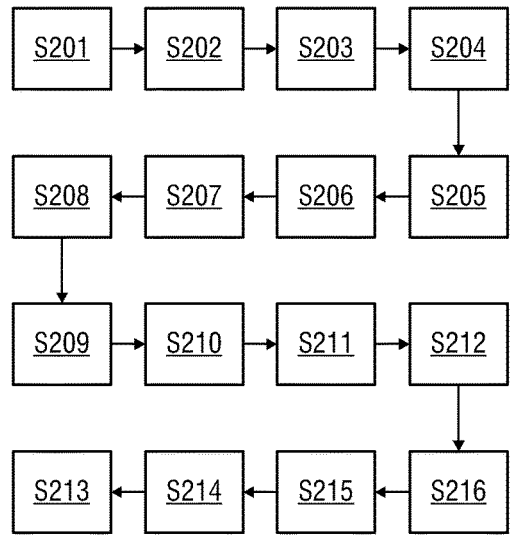

FIG. 2B shows a more detailed flow diagram of a method for determining a resistance according to an embodiment. In a first step S201 a positive pulse is generated. Then, in step S202 values are read from an Analog-to-Digital converter (ADC). In step S203 voltage values are calculated from the ADC values. These voltage values may comprise a positive voltage Vp associated with a positive valued voltage pulse or the positive value component of a voltage pulse, a negative voltage Vn associated with a negative value voltage pulse or the negative value component of a voltage pulse, and a chassis voltage Ch which is the voltage applied to the chassis.

In step S204, current values are calculated based on the measured voltage values and the calculated resistances of the electric circuit 1. In step S205, positive current and voltages value are calculated. In step S206, positive current values are collected for fitting. In step S207, the fitting for the positive pulse is ended and evaluated. In Step S208 a negative pulse is generated. Then, in step S209 values are read from an ADC. In step S210 voltage values are calculated from the ADC values. In step S211, current values are calculated based on the calculated voltage values and resistances of the electric circuit 1.

In step S212, negative current and voltages value are calculated. In step S213, negative current values are collected for fitting. In step S214, the fitting for the negative pulse is ended and evaluated. In step S215, the pulse current is calculated as half of the difference between the evaluated value from fitting the positive pulse and the evaluated value from fitting the negative pulse and the chassis voltage is calculated as half of the different between the positive chassis voltage and the negative chassis voltage. In the step S216, the insulation resistance is calculated as the resistance based on the ratio between chassis voltage and the pulse current minus Rcasc, wherein the resistance Rcasc may be a cascade resistance further explained elsewhere in this document.

Figure 3A:
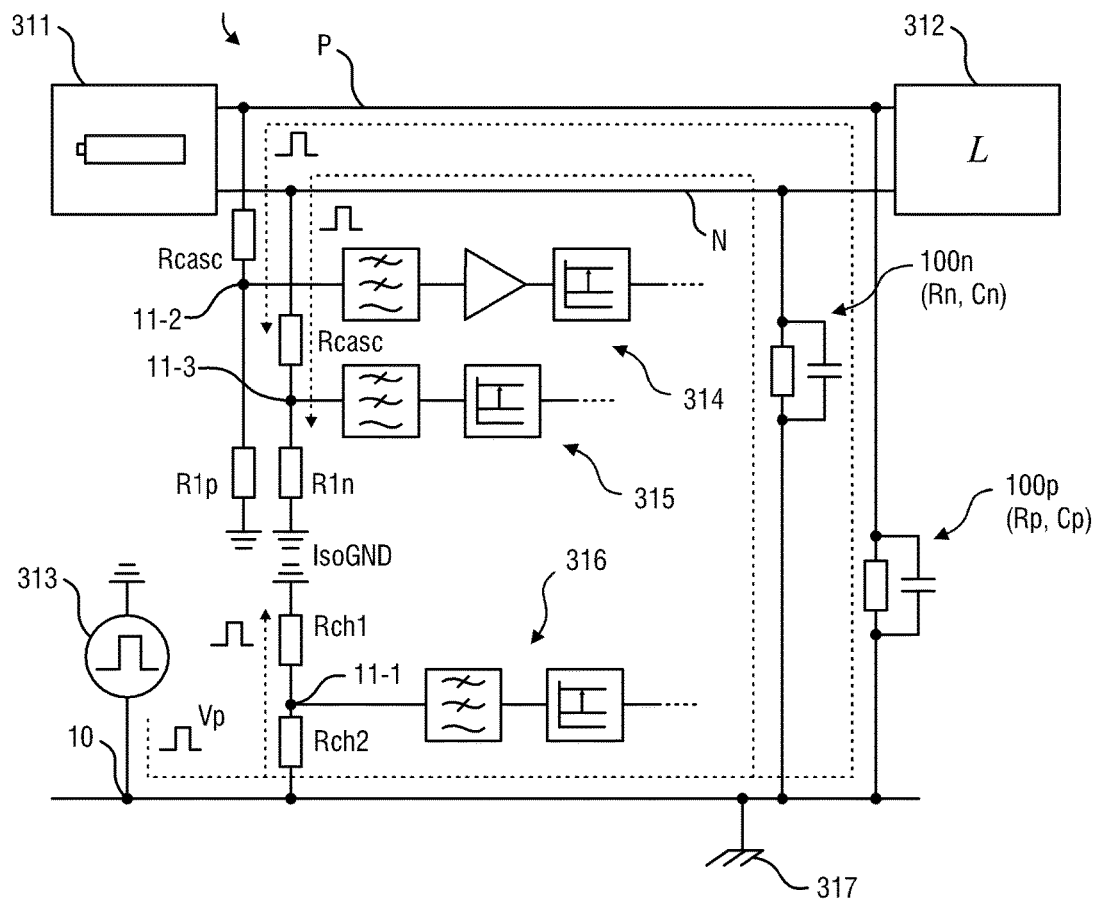
FIGS. 3A and 3B show views of electric circuits subject to insulation resistance determination according to an embodiment of the present invention.

FIG. 3A shows a view of an electric circuit 1" subject to resistance determination according to an embodiment of the present invention. In this embodiment, the circuit 1" comprises at least a battery 311, a load 312, a pulse generator 313, a circuitry 314 for measuring a positive voltage, a circuitry 315 for measuring the negative voltage, a circuitry 316 for measuring the chassis voltage, a chassis 317. The battery 311 is connected via two lines, a positive line P and a negative line N, to the load 312. The pulse generator 313 generates a voltage pulse and applies it on the side of the chassis 317. In this embodiment thus the test point 10 is in electrical connection with the chassis 317, and there are three response points 11-1, 11-2, and 11-3 considered at various parts of the circuit.

Specifically, there is considered a first test point 11-1 at a side upstream (relative to the pulse generator 313) to a first resistance 100$n$ and a second resistance 100$p$, that are respectively representing an insulation of the chassis 317 to the positive line P and the negative line N. These two resistances form together the insulation resistance Riso. Thus, in this embodiment, the resistance subject to determination is representing an insulation resistance. The corresponding insulation resistance is represented by the sets 100$p$ and 100$n$ each including a resistance and a (Y-) capacitance in parallel and provided individually for both the positive supply line P and the negative supply line N.

Circuitry 316 is provided for measuring the voltage at response point 11-1 and thus at chassis 318 and comprises for example a low pass filter (LPF), a part for offset addition, and a connection/interface to an analgia-to-digital converter (ADC) or a corresponding ADC as such. Upstream of the response point 11-1 a resistance Rch1 may be provided, while downstream of the response point 11-1 a resistance Rch2 may be provided. A low pass filter usually filters out all or the substantial parts of high frequency components above a predetermined threshold. This is usually employed for reducing the noise in the signal, which can be especially advisable in case of electric vehicles, as inverters, motors and switches usually generate noise of considerable effective power. Offset addition describes the process of adding a constant part—an offset—added to the signal. This can be advisable when the signal is fed into an ADC as some ADC are not configured to measure negative voltage values. By adding an appropriate offset to turn the entire signal positive or at least non-negative, the entire signal can be fed to and measured by the ADC. Circuitry 316 is connected to the chassis at a point upstream the chassis resistance Rch, which in turn is grounded with the ground ISOGND. Thus, the applied pulse can be well seen and detected by circuitry 316.

Circuitry 314 is arranged to measure the voltage at response point 11-2 and thus at a point electrically connected to the positive voltage line P and can be implemented essentially similarly to the described circuitries 315, 316. However, in this embodiment circuitry 314 further comprises and amplifier, such as an operational and/or inverting amplifier. This amplifier can be employed to level the positive voltage to the same level as the negative voltage. Circuitry 314 is also connected to the positive supply line P at a point downstream a resistance Rcasc. Further, there may be provided a resistance R1$p$, which in turn is grounded with the ground ISOGND. Thus, the applied pulse can be well seen and detected by circuitry 314.

Circuitry 315 is arranged to measure the voltage at response point 11-3 and thus at a point electrically connected to the negative voltage line N and can be implemented essentially similarly to the described circuitry 316. The circuitry 315 is, however, adapted to measure the negative voltage coupled to the negative supply line N. Circuitry 315 is connected to the negative supply line N at a point downstream a resistance Rcasc. Further, there may be provided a resistance R1$n$, which in turn is grounded with the ground ISOGND. Thus, the applied pulse can be well seen and detected by circuitry 315 as depicted by the broken line that represents the propagation of the voltage pulse from source 313 within the circuit.

Between the chassis (line) 317 and the positive and the negative lines P, N the insulation resistance as part of sets 100$p$ and 100$n$ is assumed. The set 100$p$ of the insulation resistance between the chassis line 318 and the positive line P comprises a resistance Rp and a capacitor Cp connected in parallel, while the set 100$n$ of the insulation resistance between the chassis line 318 and the negative line N comprises resistance Rn and capacitor Cn connected in parallel. The resistances Rp and Rn thus form the insulation resistance Riso, wherein $1/Riso = 1/Rp + 1/Rn$.

The capacitors Cp and Cn are examples of Y-capacitors capable of reducing electromagnetic interference, and as mentioned elsewhere in the present disclosure. In the following the functionalities of the circuit and how the insulation resistance can be determined will be described.

The pulse generator 313 is adapted to apply a voltage pulse to the system. Circuitries 314, 315 and 316 measure the respective voltages arriving at the respective test points: part 314 measures the positive voltage Vp, part 315 measures the negative voltage Vn, and part Vch measures the chassis voltage Vch. Thus, in the circuit 1″ and setup of this embodiment a resistance is determined as follows:

A voltage pulse VP is applied by the pulse generator 313 to test point 10 of the electric circuit 1″, the test point 10 being arranged on one side of a resistance Rn, Rp to be determined. The voltage pulse VP has a predetermined pulse duration Tp.

An electric observable eO1 at a first response point 11-2 on the other side of said resistance Rn, Rp is measured during at least a part of said pulse duration Tp by circuitry 314.

A further electric observable eO2 at a further response point 11-3 on the other side of said resistance Rn, Rp is measured during at least a part of said pulse duration Tp by circuitry 315.

A reference electric observable eORef at a reference response point 11-1 on the one side of said resistance Rn, Rp is measured during at least a part of said pulse duration Tp by circuitry 316.

During said pulse duration Tp expectation values eV are respectively estimated from the measured electric observable eO1 and measured further electric observable eO2.

The resistance Riso is determined from said expectation values and from said measured reference electric observable.

In the following, exemplary details are discussed in the context of determining a resistance in circuit 1″. Specifically, the insulation resistance Riso can be calculated as $Riso = Vch/Ipulse - Rcasc, parallel$, wherein Rcasc,parallel is the resulting resistance of the two resistances Rcasc associated with the parts measuring the positive and the negative voltage. Ipulse is the current due to the applied pulse VP generated by the pulse generator 313. When a positive and a negative component of equal magnitude are applied and the positive and the negative component are measured separately by the circuitry 314 respective the circuitry 315, the offset current as well as the current of the battery cancel each other out such that Ipulse is simply half of the difference between the positive and the negative measured current. These currents can be determined by measuring the corresponding voltages measured by the ADC that forms part of the circuitry 314 respective the circuitry 315 and dividing them by the resistance Rcasc. Thus, $Ipulse = (Imeasp - Imeasn)/2$.

Herein, Imeasp denotes the measured current during the positive part of the pulse VP applied by the pulse generator 313 and Imeasn denotes the negative part of the pulse VP applied by the pulse generator 313. Further, generally $$Imeas=Ip-In,$$

wherein $$Ip=Vp/Rcasc$$

and $$In=Vn/Rcasc.$$

Similarly, the chassis voltage Vch has to be measured during the positive and the negative part of the pulse VP and can be determined to be $$Vch=(Vchp-Vchn)/2.$$

Thus, the insulation resistance Riso can be calculated by measuring the three different voltages Vp, Vn, and Vch by the three respective circuitries 314, 315 and 316 during the positive and the negative part of the applied pulse VP. Importantly, these values are assumed to be expectation values, that is, after the initial peak due to applying/changing a voltage have vanished.

Figure 3B:
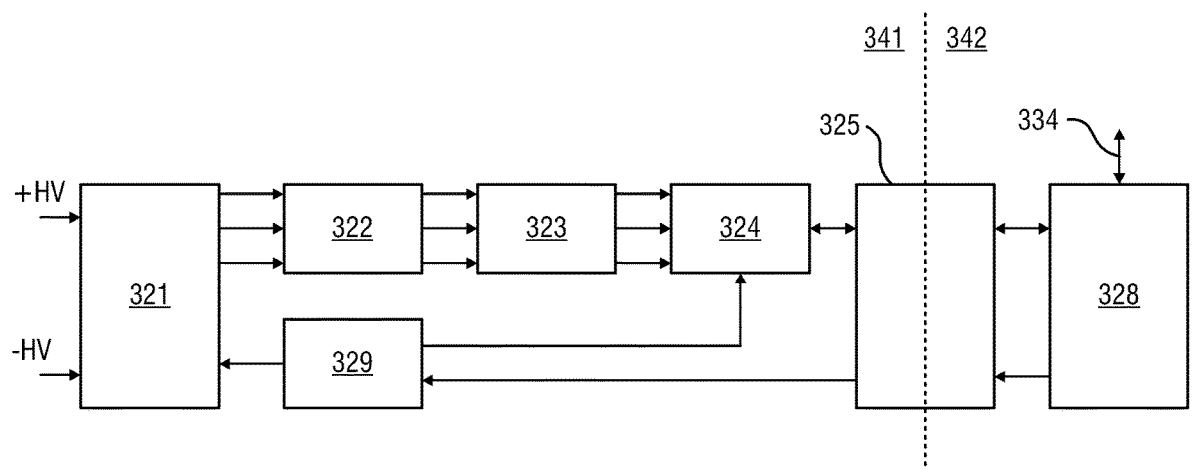

FIG. 3B shows a block diagram of a resistance determination device according to an embodiment. In this embodiment, the resistance determination device comprises a voltage divider 321, a low pass filter 323, which might be an active low pass filter, a part for offset addition 322, an Analog-to-Digital converter 324, a digital isolator 325, a microcontroller 328, and a pulse generator 329.

The micro controller 328 can communicate via an interface 334 with external elements such as a controller area network (CAN) transceiver or a high side switch (HSS) to communicate potentially occurring errors. In particular, the microcontroller can be configured to estimate during the pulse duration Tp of the applied voltage pulse VP an expectation value eV from the measured observable through the indirect connection with the ADC 324. Based thereon, it can also be configured to determine the resistance from the estimate expectation value. Further, it can react to the result of the resistance determination, that is, can determine whether a fault such as a short circuit, a resistance exceeding a predetermined threshold or an insulation breakage occurred and can initiate any appropriate reaction to the determined fault.

The digital isolator 325 separates the electric circuit in two electronically isolated parts. Equally, an isolated power supply can be part of the resistance determination device which is accordingly separated in a left part of the isolated power supply 341 and a right part of the isolated power supply 342. The power supply provides the current/voltage to the load as well as to a low drop out voltage regulator which converts a voltage such that it can be applied to a charge pump inverter as well as for supplying the analog and digital circuitry. The microcontroller 328 can be an automotive microcontroller. The digital isolator provides digital output to the pulse generator 329.

The pulse generator 329 provides the voltage pulse VP to the voltage divider 321, said pulse being the voltage pulse with a predetermined duration Tp that is applied to the test point 10 of the electric circuit 1. The voltage divider 321 provides a positive voltage Vp, a negative voltage Vn, and a chassis voltage Vch to the active low pass filter 322 which filters out the high frequency components to reduce noise. Then, the filtered voltages are provided to the part for offset addition 323. The part 323 adds an offset to the received voltages, both the positive voltage Vp and the negative voltage Vn, wherein the part 323 also first applies an inverting amplification to the positive voltage Vp.

Finally, these voltages are provided to the ADC 324. The ADC 324 also receives information from the pulse generator 329. These steps performed at the active low pass filter 322, the part for offset addition 323 and the ADC 324 can be summarized as measuring an electric observable EO at least one response point 11 of the electric circuit 1 during at least a part of the pulse duration Tp of the applied voltage pulse VP.

Figure 4A:
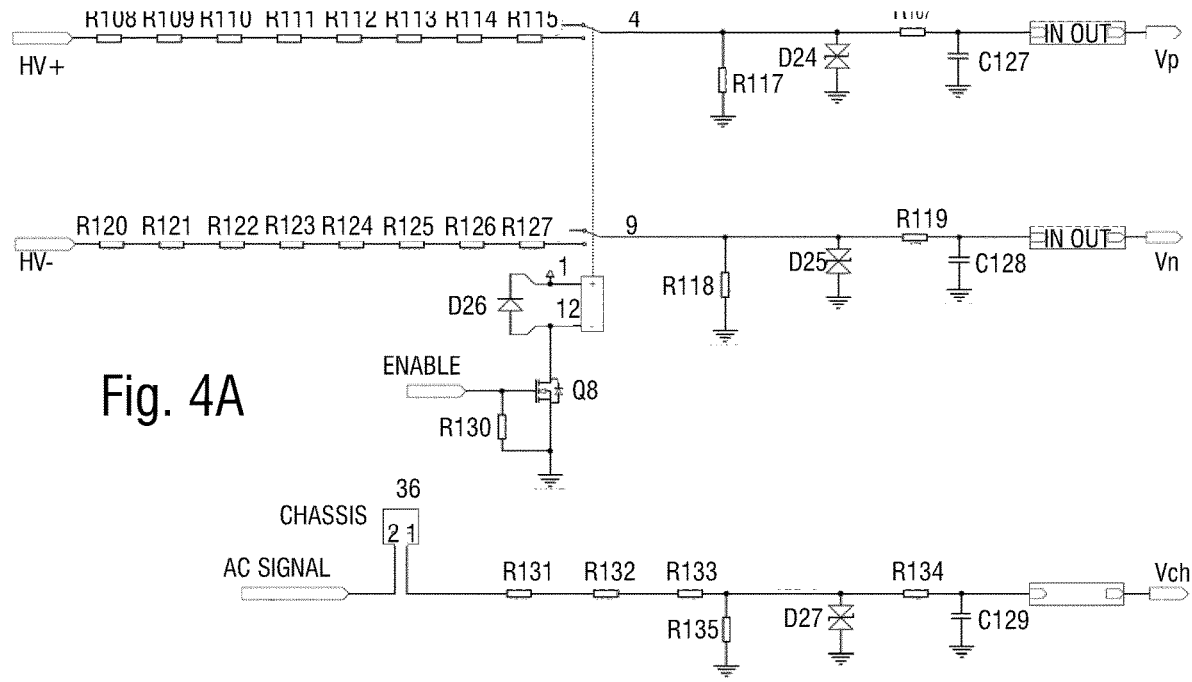
FIGS. 4A and 4B show schematic views of details of the components mentioned and explained in conjunction with the circuits of FIGS. 3A and/or 3B, according to corresponding embodiments of the present invention.

FIG. 4A shows three different parts of a voltage divider. The top part shows the first two parts of the voltage divider which are connected to each other while the lower part shows the third part of the voltage divider which may have no direct connection to the other parts. The first part of the voltage divider may comprise a connecting part to connect this part of the voltage divider to the positive side of the high voltage HV+. Further, it may comprise a set of resistances in series, such as the resistances R108, R109, R110, R111, R112, R113, R114, and R115. These resistances may have all the same value or may have different value. It may be preferred that these resistances have value such as 330 kΩ, 270 kΩ or 300 kΩ.

In particular, these resistances arranged such that the first resistance from the connecting part has the highest value, followed by the second resistance having the lowest value and the remainder having a middle value which may be the same for all of these remaining resistances. Next to the last of the series there may be provided a switch, which may connect the first of the three parts with the second part of the voltage divider which is described elsewhere in this document. Following the switch, there may be provided a resistance R117, a transient-voltage-suppression diode D24, a resistance R107 and a capacitor C127 followed by an IN-OUT converter which may lead to the positive voltage Vp; these parts may be provided in this order. The resistance R117, the diode D24, the capacitor C127 may be provided in parallel to the remaining part and may be grounded. The resistance R117 may have the value 4,7 kΩ while resistance R107 may have the value 47 kΩ, the capacitor C127 may have the value 10 pF and the IN-OUT converter may be of the type Follower SchDoc.

The second part of the voltage divider may comprise a connecting part to connect this part of the voltage divider to the negative side of the high voltage HV−. Further, it may comprise a set of resistances in series, such as the resistances R120, R121, R122, R123, R124, R125, R126, and R127. These resistances may have all the same value or may have different value. It may be preferred that these resistances have value such as 330 kΩ, 270 kΩ or 300 kΩ. In particular, these resistances arranged such that the first resistance from the connecting part has the highest value, followed by the second resistance having the lowest value and the remainder having a middle value which may be the same for all of these remaining resistances.

Next to the last of the series there may be provided a switch, which may connect the first of the three parts with the first part of the voltage divider which is described elsewhere in this document. Following the switch, there may be provided a resistance R118, a transient-voltage-suppression diode D25, a resistance R119 and a capacitor C128 followed by an IN-OUT converter which may lead to the positive voltage Vp; these parts may be provided in this order. The resistance R118, the diode D25, the capacitor C128 may be provided in parallel to the remaining part and may be grounded. The resistance R118 as may have the value 4,7 kΩ while resistance R119 may have the value 47 kΩ, the capacitor C128 may have the value 10 pF and the IN-OUT converter may be of the type Follower SchDoc.

The second part of the voltage divider may also contain a circuit connected to the two switches of the first resp. second part of the voltage divider. This circuit may comprise a diode D26, a source, an element with a positive and a negative side as well as MOSFET Q8, an element ENABLE, a resistance R130 and may be grounded. The element is provided parallel to the diode D26, the MOSFET Q8 is provided parallel to the resistance R130, while these two parts are provided in series to each other. The resistance may have the value 10 kΩ, the source may be a component D5V0, the diode D26 may of the type 1N4148WX-TP and the MOSFET may be of the type BSS138N H6327.

The third part of the voltage divider connects an alternating signal AC SIGNAL with the chassis voltage Vch via the chassis. That is, the element AC SIGNAL is connected to the chassis, which in turn, is connected to the chassis voltage in a similar manner as the first two parts described elsewhere. This connection may comprise a set of resistances R131, R132, R133, R134, R135, a transient-voltage—suppression diode, a capacitor C129, and an IN-OUT converter. The resistances R131, R132, R133 may have the same value and this value may be 100 kΩ, further, they may be provided in series next to chassis. The resistance R135 may be provided next and may be provided in parallel. It may have the value 8,06 kΩ. This may be followed by the diode D27, which may also be provided in parallel to the main line to the chassis voltage Vch. Next, the resistance R134 may be provided in series, followed by the capacitor C129, which may be provided in parallel. All three elements provided in parallel may be grounded. The resistance R134 may have the value 47 kΩ. The IN-OUT converter may be of the type Follower SchDoc.

Figure 4B:
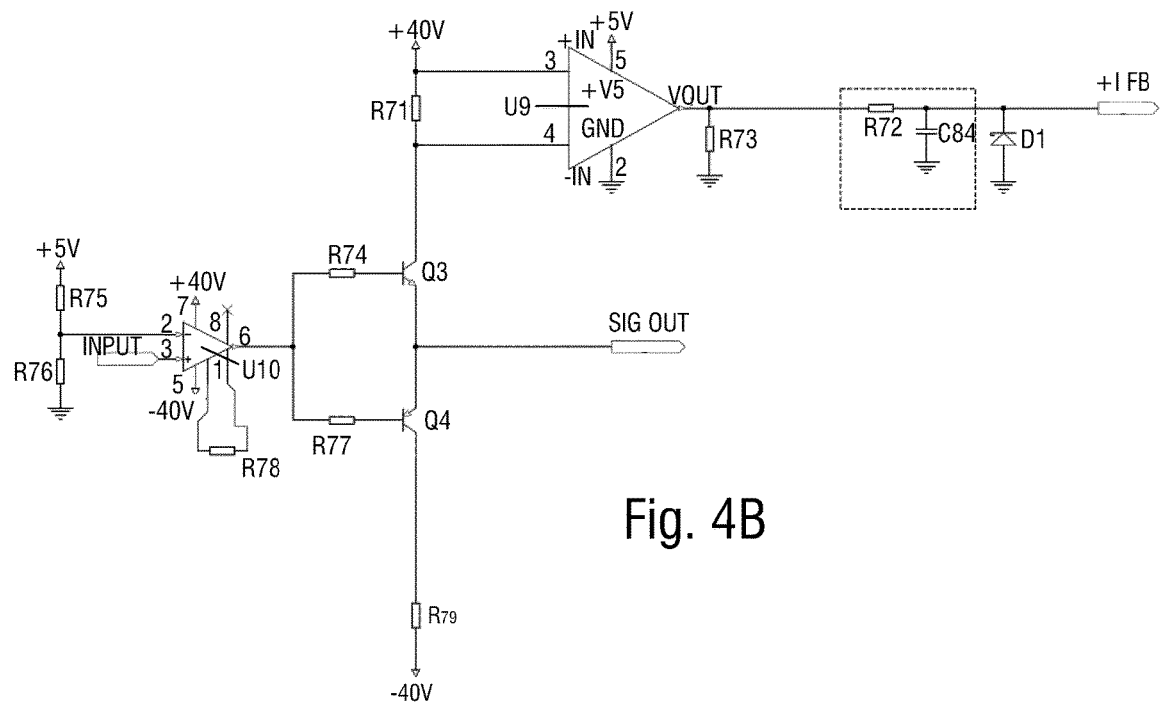

FIG. 4B shows the schematics of the pulse generator. Starting from the left side, FIG. 5A shows a source with a voltage of 5V connected to two resistances in series, R75 and R76, which are grounded. The first resistance R75 may have the value 118 kΩ while the second resistance may have the value 47 kΩ. In between those resistance a line may be provided, connected to a comparator U10. Further, there might be provided an INPUT, a source with +40V, a source with –40V, a resistance R78, all connected to the comparator U10. The resistance R78 may have the value 2,2 kΩ. A line leaving the comparator U10 may be forked into two, each of these lines may be provided with a resistance R74 on the top line resp. R77 on the bottom line. Both of these resistances may have the value 1 kΩ.

Following the resistances, each of the line may lead to a transistor, a transistor Q3 for the top line and a transistor Q4 for the bottom line. The transistor Q4 may have the characteristics Hfe=100, Icmax=50 mA, Ibmin=0.5 mA. Further, it may be connected in series with a resistance R79, which in turn may be connected with a source with voltage –40V. The resistance R79 may have the characteristics 105 and Rs, 10 mA=100 mV. The transistor Q3 may have the characteristics Hfe=100, ICmax=50 mA, Ibmin=0.5 mA and may be of the type PMBTA45,215. The two transistors Q3 and Q4 are connected and the connecting line may have a branch to SIG OUT. This connected line may have the characteristic ILmax=10 mA.

Upstream, the transistor Q3 may be connected with a resistance R71 in series, said resistance R71 being connected to a source with a voltage of +40V. The resistance R71 may have the characteristics 105 and Rs, 10 mA=100 mV. Upstream and downstream of the resistance R71 may be provided a line connected to a comparator U9, Further, this comparator U9 may be grounded and may be connected to a source with voltage +5V. This comparator U9 may be of the type INA169NA3K. In addition to these lines, the comparator U9 may be connected to an element +I FB. Along this line there may be provided: a resistance R73, a resistance R72, a capacitor C84, and a diode D1, which may be provided in this order. The resistance R73 may be provided in parallel to the connected line and may have the characteristics RL, 47 kΩ. The resistance R72 may be provided in series between the comparator U9 and the element +I FB and may have the value 1,47 kΩ. The capacitor C84 may have the value 220 nF. The complex consisting of the resistance R72 and the capacitor C84, which may be considered as a RC circuit, may have the characteristic Fc=492 Hz. The diode D1 may be of the type PTVS6V051UR.

FIG. 5A shows details about the estimation processing during the pulse duration Tp. In FIG. 5A a rectangular voltage pulse VP is applied for a pulse duration of Tp. The thick line, which is first solid and then turns dashed, shows the behavior of the electric observable eO during the pulse duration Tp. For example, the electric observable eO assumes a relatively high initial value at the beginning of the pulse VP and then decreases. The electric observable eO can be assumed to approach some expectation value eV, after a certain time and within a predetermined tolerance. Specifically, it can be assumed that the expectation value eV is approached at a time T that greater than the pulse duration Tp. Here it has to be noted that the behavior of the electric observable eO after the pulse duration Tp is rather of theoretical nature as it has to be expected that with the change of the applied voltage once the pulse duration has ended also the electric observable changes. Nevertheless, it is shown in FIG. 5A that the value of the electric observable eO at the end of the pulse duration is not within the predetermined tolerance of the expectation value eV approached after time T. A high initial value, that is, substantially different from the expectation value eV, can be for example a deformation due to capacitors and the insulation resistance and increases with increased capacitances and increased insulation resistance. This effect can be explained by considering the product of the resistance and the capacitance, i.e. using the terms of FIG. 3a the product of Rp and Cp resp. Rn and Cn. An increase in this product leads to an increase in deformation, also because the charging of a capacitor with a higher capacitance is slower, thus resulting in a distorted signal. This may be explained by an exponential law as common used to describe the temporal behavior of an RC circuit.

During at least a part of the pulse duration Tp, the electric observable eO is measured as eOm and as shown as a solid line. This measured electric observable eOm is used to estimate the expectation value eV of the electric observable eO before the electric observable eO actually reaches said expectation value eV at the later time T. According to an embodiment, measuring the electric observable eOm during the first, bold part is sufficient to estimate the expectation value eV of the electric observable eO based on the measured electric observable eOm. Based on this, the resistance can be determined. In particular, the embodiment of the present invention allows this determination even if the electric observable eO does not approach the expectation value eV of interest within a predetermined tolerance during the pulse duration Tp, but only substantially thereafter at time T. An assumed and hypothetical behavior of the electric observable eO between the known—because measured—behavior as shown with the solid line and the estimated expectation value eV is drawn with a broken line and denoted by eO'.

Thus, not only the determination can be faster than conventional methods which use the value towards the end of the pulse duration, the method can also be able to determine the resistance irrespective whether the expectation value is approached during the pulse duration by estimating the expectation value. Specifically, the embodiments of the present invention render resistance determination—and, in particular, insulation resistance determination—much more responsive independent from the characteristics of the effective circuit including possible high capacitances, inductances and other reactant components.

FIG. 5B shows details about the behavior of the electric observable eO with time when a voltage pulse VP of duration Tp is applied, as—for example—occurring in a circuit identical, similar or equivalent to the one described in conjunction with FIG. 3A. FIG. 5B shows the corresponding behavior of electric observables in form of the currents In and Ip derived from—for example—a voltage measured by circuits 314 and 315 of FIG. 3A as function of time. A voltage pulse is similarly applied and has duration Tp, which is of course visible in the behavior of the electric observables.

The resistance can be determined for each part of the pulse sequence in line with the details as described elsewhere in the present disclosure. Also similarly to FIG. 5A, the electric observable eO has its highest value at the beginning of the pulse and then decreases, approaching an expectation value. This decay towards the expectation value might follow an exponential law but might follow any other decreasing function as well. Particularly, the expectation value is the relevant value for determining the resistance. Thus, it is required that this value can be determined before the end of the pulse duration Tp. This especially relevant when the determined resistance is an insulation resistance and continuous monitoring in real-time is necessary.

FIG. 5B shows not only one electric observable eO but shows both the electric observable measured at the positive line between the battery and the load while the pulse is being applied as well as the electric observable measured at the negative line between the battery and the load while the pulse is being applied, in the sense of an electric observable and, respectively, a further electric observable as mentioned elsewhere in the present disclosure. Further, FIG. 5B also shows the difference between the electric observable which—in line with the description of FIG. 3A—is calculated in an embodiment to determine the resistance.

Note that the change to the electric observable after the initial phase corresponds to applying the battery voltage.

Further, the time required for the system to approach the expectation value eV depends on the parameters used. In particular, the voltage typically applied in the system has an influence: If the system uses high voltages, the required resistances to provide sufficient insulation are high as well. Further, also the capacitances required to provide sufficient reduction of EMI are higher in this case. Both of these factors lead to a longer time T until the expectation value is approached. In other words, high resistances and high and capacitances lead to an increased waiting time T until the expectation value eV of the measured observable eO is approached. This might lead to a scenario where waiting until the expectation value eV is approached is not a feasible strategy.

Therefore, such a system requires a method for determining the resistance that is not based on the above but uses a different route. Instead, it is provided a step of fitting the measured electric observable in a first part of the pulse duration Tp to a predetermined model. By adding this step of fitting, the long waiting time can be reduced and the dependency on the system parameters can be reduced or even removed. Indeed, using an appropriate estimation method the determination process in independent of a measurement of the expectation value of the electric observable eO as instead it is fitted and further steps are performed based on the fitted value.

Thus, this provides a faster method for determining a resistance and in particular provides a method that is independent of or less dependent on system parameters that could make an insulation resistance monitoring impossible due to the long waiting time until the expectation value of the relevant electric observables is reached.

FIG. 6A shows a schematic view of a device embodiment 61. The device embodiment may comprise printed circuit board (PCB) 611 forming the base upon which components are mounted. The PCB 611 may have holes 612 for mounting the PCB onto another entity, such as an entity of an electric vehicle. Further, the device 61 may comprise a high voltage connector 613. Additionally, the device 61 may comprise a module 614 mounted on the PCB 611, said module 614 may for example be a relay. Furthermore, a discrete passive component 615 and/or a discrete active component 617 may be part of the device 61 and may be mounted on the PCB 611. Further, also an integrated circuit (IC) 616 may be part of the device 61 and also the IC 616 may be mounted on the PCB. This device 61 is configured to generate and apply a voltage pulse VP with a predetermined pulse duration Tp to a test point 10 of an electric circuit 1, measure an electric observable at a response point of the electric circuit during at least a part of the pulse duration Tp, estimate during the pulse duration Tp an expectation value from the measured observable and further determine the resistance from the expectation value.

FIG. 6B shows a schematic view of a general device embodiment 60 of the present invention. This device embodiment 60 includes a memory 601, a processing unit 600, and an interface 602. The memory 601 can exchange data with the processing unit 600 and the processing unit 600 can additionally exchange data with the interface 602 while the interface 602 can provide a connection to the electric circuit 1. Thus, the processing unit 600 is provided with data from the memory 601 and instructs the interface 602 to communicate to the electric circuit 1 that a voltage pulse VP with predetermined duration Tp is to be applied to the circuit 1. In a next step, the interface 602 is instructed by the processing unit 600 to request measurement of the electric observable eO of the electric circuit 1 during at least part of the pulse duration Tp. Having received this, the processing unit 600 estimates during the pulse duration an expectation value eV of the electric observable eO and in a next step determines the resistance based on the expectation value eV as well as data stored in the memory. In a further step, the processing unit 600 may communicate this resistance and the result of the determination whether a fault has occurred via the interface 602 to the outside and may further initiate an appropriate reaction.

Although detailed embodiments have been described, these only serve to provide a better understanding of the invention defined by the independent claims and are not to be seen as limiting.

The invention claimed is:

1. A method of determining a resistance in an electric circuit, the method comprising:
   applying a voltage pulse to a test point of said electric circuit using pulse injection, said voltage pulse having a predetermined pulse duration;
   measuring an electric observable at a response point of said electric circuit during at least a part of said pulse duration;
   estimating during said pulse duration an expectation value from said measured electric observable by fitting measured values of the measured electrical observable to a predetermined model; and
   determining said resistance from said expectation value, wherein:
   the electric observable is voltage and current; and
   the predetermined model is an exponential model.

2. The method of claim 1, wherein the voltage pulse is applied at the test point on one side of said resistance to be determined and the electric observable is measured at a response point on the other side of said resistance to be determined.

3. The method of claim 1, wherein the voltage pulse is applied at the test point on one side of said resistance to be determined and the electric observable is measured at the response point on the other side of said resistance to be determined, and the method further comprises:
   measuring a reference electric observable at a reference response point on the one side of said resistance to be determined.

4. The method of claim 1, wherein the electric observable is measured at a response point being the same as the test point at which the voltage pulse is applied.

5. The method according to claim 1, wherein said pulse duration is shorter than a time span during which said observable approaches, within a predetermined tolerance, said expectation value.

6. The method according to claim 1, wherein the resistance is an insulation resistance.

7. The method according to claim 1, wherein the electric circuit is any one of an unearthed electric circuit, a vehicle-side battery circuit, an electric circuit in a high-voltage system, an electric circuit comprising a Y-capacitor or an electric circuit during charging.

8. The method according to claim 1, wherein the applying of the voltage pulse comprises superimposing a voltage pulse.

9. The method according to claim 8, wherein the superimposed voltage pulse is an alternating voltage pulse.

10. The method according to claim 1, further comprising:
    determining whether a fault has occurred based on the determined resistance, wherein the fault is any one of a short circuit, a resistance exceeding a predetermined threshold or an insulation breakage.

11. A device for determining a resistance in an electric circuit, wherein the device is configured to:
    apply a voltage pulse to a test point of said electric circuit using pulse injection, said voltage pulse having a predetermined pulse duration;
    measure an electric observable at a response point of said electric circuit during at least a part of said pulse duration;
    estimate during said pulse duration an expectation value from said measured observable by fitting measured values of the measured electric observable to a predetermined model; and
    determine said resistance from said expectation value, wherein:
    the electric observable is voltage and current; and
    the predetermined model is an exponential model.

* * * * *